United States Patent [19]

Smith et al.

[11] Patent Number: 5,428,254

[45] Date of Patent: Jun. 27, 1995

[54] UNIVERSAL ENERGY PACK

[75] Inventors: Richard B. Smith, Bethel; Jay R. Lucas, Bethany; Alexander Forman, Danbury; George N. Kringel, Westport, all of Conn.

[73] Assignee: Duracell Inc., Bethel, Conn.

[21] Appl. No.: 973,353

[22] Filed: Nov. 9, 1992

[51] Int. Cl.$^6$ .................................. H04N 5/225
[52] U.S. Cl. ................................ 307/150; 354/295
[58] Field of Search ............. 307/149, 150; 320/2; 354/295, 484

[56] References Cited

U.S. PATENT DOCUMENTS

| | | | |
|---|---|---|---|
| 3,963,972 | 6/1976 | Todd | 307/150 |
| 4,739,242 | 4/1988 | McCarty et al. | 320/2 |
| 5,013,139 | 5/1991 | Stopa et al. | 307/150 |
| 5,051,867 | 9/1991 | Burgher et al. | 307/150 |
| 5,068,683 | 11/1991 | Miyazaki | 354/484 |
| 5,124,532 | 6/1992 | Hafey et al. | 320/2 |
| 5,151,727 | 9/1992 | Sasaki | 354/76 |
| 5,189,520 | 2/1993 | Okayasu et al. | 358/229 |
| 5,281,990 | 1/1994 | Huang | 354/484 |

Primary Examiner—Jeffrey A. Gaffin
Attorney, Agent, or Firm—Ronald S. Cornell; Barry D. Josephs

[57] ABSTRACT

A battery pack has a plurality of female contacts for supplying electricity to different electrical devices. The contacts are recessed in cavities in the pack which open outwardly to two adjacent exterior surfaces of the pack, such as the bottom surface and a front or rear wall surface. Each female contact comprises a parallel and opposing pair of contact arms having a curved contact surface for gripping various types and sizes of male contacts from an electrical device. This combination of the female contacts and their accessibility to a mating male contact from two adjacent, external surfaces of the pack enables a single pack to be useful for a variety of different electrical devices.

21 Claims, 6 Drawing Sheets

UNIVERSAL ENERGY PACK

BACKGROUND OF THE INVENTION

1. Technical Field

The present invention is directed to an energy pack. More particularly, the present invention is directed to a universal energy pack capable of being secured to at least two different electrical devices. Additionally, the present invention is directed to an energy pack designed to facilitate recycling.

The present invention finds particular utility when used in conjunction with a portable electrical device, including but not limited to video camcorders, cellular telephones, computers and other data storage, manipulation and/or retrieval devices, radios, televisions and other types of receivers and/or transmitters, and toys.

2. Background Information

An energy pack is a rechargeable energy storage device capable of storing energy for use by an electrical device. Different energy packs for use with different types of devices, e.g., video camcorders, cellular telephones, computers and the like, are well known in the art.

Typically, the energy pack for these different devices provides a substantially similar power source of about 6 volts d.c. to its respective device. Additionally, the outer dimensions of these different energy packs are often substantially similar.

Despite these similarities, however, an energy pack for one type of device is not interchangeable with the energy pack for a different type of device. Additionally, the energy packs are not even interchangeable between similar types of devices having different manufacturers.

Under normal operating conditions, a fully charged energy pack can typically operate a device several hours. In order to fully restore the charge, the energy pack must be placed in a recharger. If the user desires to operate the device after the energy pack has run too low for further device operation but before the energy pack has been recharged, the user must possess, e.g., a spare energy pack.

Many consumers own at least two different electrical devices which require an energy pack. Given the cost associated with purchasing a spare energy pack for each of these devices, and given the substantially similar electrical characteristics and physical dimensions of many energy packs, it would be advantageous for energy packs to be interchangeable. In this way, a single energy pack can be used on one of several devices, either as a primary or as a spare power source.

All rechargeable energy packs eventually lose their capacity to hold a charge, especially after prolonged service life where the energy pack has been repeatedly recharged. Thus, the user ultimately disposes of the energy pack. Given the increasing desire of society to recycle, it would be advantageous to be able to recycle energy packs.

SUMMARY OF THE INVENTION

The present invention is directed to a universal energy pack capable of supplying energy either to a first or to a second electrical device. In addition, the universal energy pack is capable of being attached either to a first or to a second electrical device.

In a first embodiment, the universal energy pack includes a case having a plurality of surfaces and an energy source located within the case. The energy pack further includes first and second contacts electrically connected to the positive and negative outputs, respectively, of the energy source. The position of the first and second contacts preferably correspond to the position of the positive and negative contacts, respectively, of the first electrical device. Additionally, the energy pack includes third and fourth contacts electrically connected to the positive and negative outputs, respectively, of the energy source. The position of the third and fourth contacts preferably correspond to the position of the positive and negative contacts, respectively, of the second electrical device. Thus, the universal energy pack is capable of supplying energy either to the first or to the second electrical device.

Preferably, the first and second contacts each comprise dual resilient contact surfaces located opposite each other and substantially perpendicular to an adjacent case surface. In this way, the amount of contact surface parallel to the surface of the case is substantially minimized. Thus, the arrangement severely limits access to the contact from loose objects which might short circuit a pair of contacts.

Additionally, the first, second, third and fourth contacts are preferably recessed, relative to the exterior surface of the case. Recessing the contacts relative to the exterior surface of the case tends to further limit access to the contacts from loose objects which might short circuit a pair of contacts. Thus, the contacts of the present invention offer a distinct safety advantage over contacts which are flush, relative to the case surface.

In a second embodiment, the universal energy pack includes a case having a plurality of surfaces, an energy source located within the case, and first and second contacts electrically connected to the positive and negative outputs, respectively, of the energy source. Additionally, the energy pack includes first means for releasably securing the case to the first electrical device and second means for releasably securing the case to the second electrical device. Thus, the universal energy pack is capable of being attached either to the first or to the second electrical device.

Preferably, the first means for releasably securing the case to the first electrical device comprises at least a first and a second opening in the case. The first electrical device is preferably designed with projections which correspond with the openings in the case and, when inserted therein, removably secure the energy pack to the first electrical device.

Additionally, the second means for releasable securing the case to the second electrical device preferably comprises at least a third and a fourth opening in the case. The second electrical device is preferably designed with a set of locking contacts which, when inserted in the third and fourth openings, simultaneously contact the energy source, as well as removably secure the energy pack to the second electrical device.

In yet another embodiment, the case of the energy pack includes a channel located at least partially along the case. Preferably, the channel is located at least partially along an interior surface of the case. The channel decreases the structural integrity of the case, thereby facilitating the fracture thereof.

Specifically, by applying a sufficient amount of pressure to the case at predetermined pressure points, the case should fracture. As the energy source is preferably a plurality of battery cells, the fracturability of the en-

DESCRIPTION OF THE PREFERRED EMBODIMENT(S)

Figure 1:
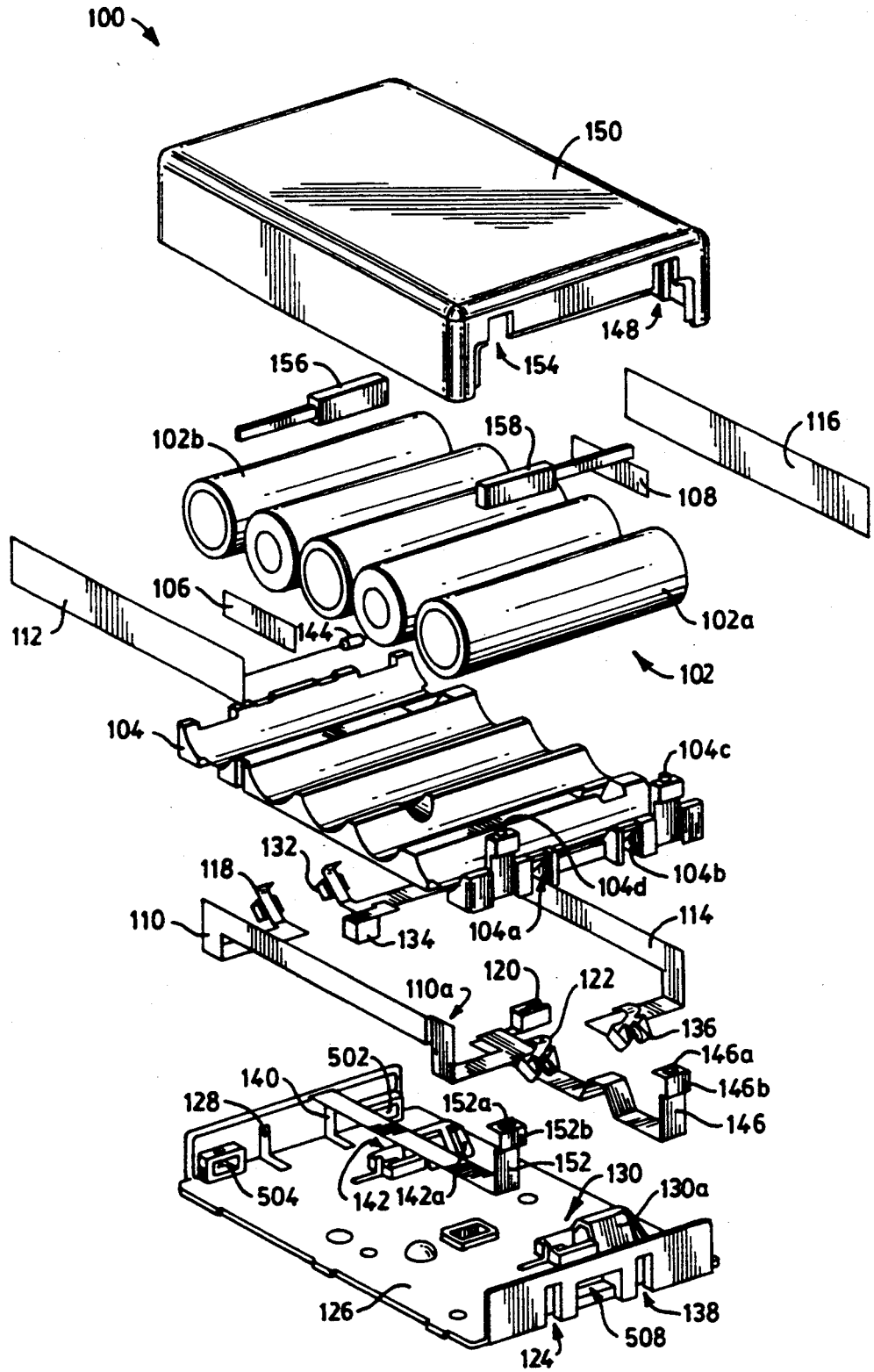
FIG. 1 illustrates an exploded isometric view of a preferred embodiment of the energy pack of the present invention.

Turning now to FIG. 1, an exploded isometric view of a preferred embodiment of the universal energy pack of the present invention is illustrated. Universal energy pack 100 preferably comprises plurality of cells 102 which reside on cell tray 104.

Cells having various chemical compositions are well known in the art. Common types of non-rechargeable battery cells, often referred to as primary cells, include zinc-carbon and alkaline. Common types of rechargeable battery cells, often referred to as secondary cells, include nickel-cadmium, nickel-metal-hydride and lithium.

In the preferred embodiment, five 1.2 volt, size AA nickel-metal-hydride cells, electrically connected together in series, are employed to provide a 6 volt d.c. rechargeable power source.

As known in the art, increasing the number of battery cells employed will provide increased service life to an electrical device in certain applications. Accordingly, six nickel-metal-hydride cells may be employed. It will be obvious to those skilled in the art that different cell chemistries, different cell sizes and/or either a greater or lesser number of cells can be used, depending upon, e.g., intended application, cost considerations, desired voltage output and desired capacity.

The cells are preferably electrically connected together in series via plurality of battery straps, e.g., 106, 108. The battery straps are preferably a metallic strip, e.g., copper, which are arranged to electrically connect the cells in series.

Negative bus 110 preferably contacts the negative terminal of cell 102a via indent 110a. The terminal ends of the remaining cells are preferably electrically isolated from the negative bus via insulator 112.

Similarly, positive bus 114 preferably contacts the positive terminal of cell 102b via an indent (not shown). The terminal ends of the remaining cells are preferably electrically isolated from the positive bus via insulator 116.

Negative bus 110 includes contacts 118, 120 and 122. Contact 122 resides in recess 104a of the cell tray and is accessible at opening 124 in case bottom 126. A similar recess (not shown) is available for contact 118, which is accessible at opening 128 in the case bottom. Contact 120 is accessible at opening 130 in the case bottom.

Similarly, positive bus 114 includes contacts 132, 134 and 136. Contact 136 resides in recess 104b of the cell tray and is accessible at opening 138 in the case bottom. A similar recess (not shown) is available for contact 132, which is accessible at opening 140 in the case bottom. Contact 134 is accessible at opening 142 in the case bottom.

Figure 2:
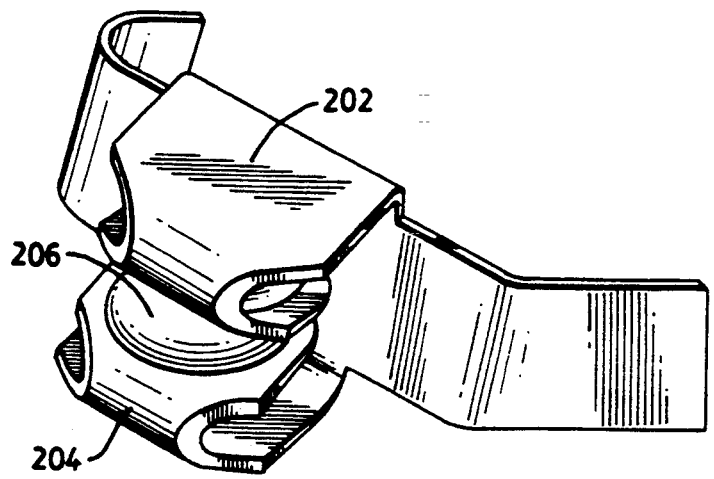
FIG. 2 is a detailed view of a preferred embodiment of some of the contacts employed by the energy pack shown in FIG. 1.

Contacts 118, 122, 132 and 136 are best shown with reference to FIG. 2, wherein each contact comprises first contact point 202 and second contact point 204 located opposite each other and electrically connected together by its respective positive or negative bus. Each contact point is substantially U-shaped and preferably includes a convex surface, e.g. 206 on contact point 202.

The surfaces of the first and second contact points are preferably perpendicular, relative to the surface of the case. In this way, the amount of contact surface parallel to the surface of the case is substantially minimized. Thus, the arrangement severely limits access to the contact from loose objects which might short circuit a pair of contacts. By decreasing the width of the opening, e.g., opening 124, 128, 138 and 140, through which electrical connection is made to a contact, access to the contact from loose objects is further restricted.

In the preferred embodiment, contacts 118, 122, 132 and 136 are bent at an angle, as shown in FIG. 2. The angle causes the contact points to be recessed, relative to the exterior surface of the case, e.g., opening 124. Recessing the contacts relative to the exterior surface of the case tends to further limit access to the contacts from loose objects which might short circuit a pair of contacts.

An electrode (not shown) from a device is contemplated to contact the convex surface of each contact point to provide electrical connection thereto. The electrode is contemplated to preferably be either plate-like, disc-like or rod-like, although other shapes are also satisfactory. The electrode would preferably be in electrical communication with the contact on each of its two opposing contact point surfaces.

The clearance between the two opposing contact point surfaces is preferably less than the outer dimension of the electrode to be placed therebetween. In this way, the contact points will exert a slight pressure on the electrode, providing a spring-like resilient contact therebetween. Any over-stress on the contact points from the electrode will be relieved due to the U-shaped contact point design.

Given the relative dimensions of the two opposing contact point surfaces and the electrode to be placed therebetween, the electrode would tend to rub against the contact points when being inserted therein or removed therefrom. This frictional communication would tend to remove any foreign particles, e.g., dirt or oxidation, located on either the contact points or the electrode. Thus, the present arrangement would tend to clean the contacts and/or the electrodes whenever the energy pack of the present invention is inserted on or removed from a device.

Returning now to FIG. 1, contacts 120 and 134 preferably reside above openings 130 and 142, respectively. Thus, contacts 120 and 134 are also recessed, relative to the exterior surface of the case. Electrical connection to recessed contacts 120 and 134 are described in more detail with reference to FIG. 7 below.

Universal energy pack 100 preferably further comprises thermistor 144 electrically connected between cells 102 and temperature bus 146. In the preferred embodiment, thermistor 144 is 10K ohm, such as model 135-103FAC-J01 available from Fenwal Electronics in Milford, Mass. As well known in the art, the thermistor and temperature bus are provided for sensing the temperature of the cells during a recharging operation.

Temperature bus 146 preferably resides on the cell tray 104 and is retained thereon via placing opening 146a of the temperature bus over pin 104c of the cell tray. Portion 146b of the temperature bus is preferably accessible at opening 148 in case top 150. In the preferred embodiment, an insulator (not shown) is placed between the positive bus and the temperature bus to electrically isolate each from the other.

Data bus 152, commonly included in energy packs for future use, preferably resides on cell tray 104 and is retained thereon via placing opening 152a of the data bus over pin 104d of the cell tray. Portion 152b of the data bus is preferably accessible at opening 154 in case top 150. In the preferred embodiment, an insulator (not shown) is placed between the negative bus and the data bus to electrically isolate each from the other.

Universal energy pack 100 preferably further comprises thermostats 156 and 158. In the preferred embodiment, thermostat 158 is provided in the event thermostat 156 malfunctions. Thermostat 156 is preferably set for 75° C., such as model 4MM75C-01, and thermostat 158 is preferably set for 95° C., such as model 4MM95C-01, both available from Texas Instruments.

Figure 3:
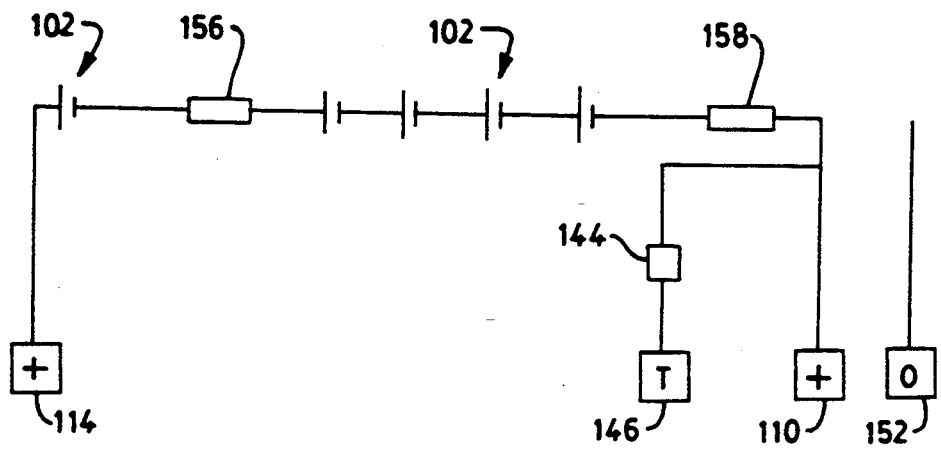
FIG. 3 is a schematic of a preferred embodiment of the connection between the electrical components of the energy pack shown in FIG. 1.

The cells, thermistor and thermostats are preferably electrically connected in series, as shown with reference to FIG. 3. As illustrated in FIG. 3, thermostats 156 and 158 are in series with cells 102, the endpoints of which are connected to negative bus 110 and positive bus 114. Additionally, thermistor 144 is connected between the negative bus and temperature bus 146. As will be appreciated by those skilled in the art, other electrical connections will be obvious.

Figure 4:
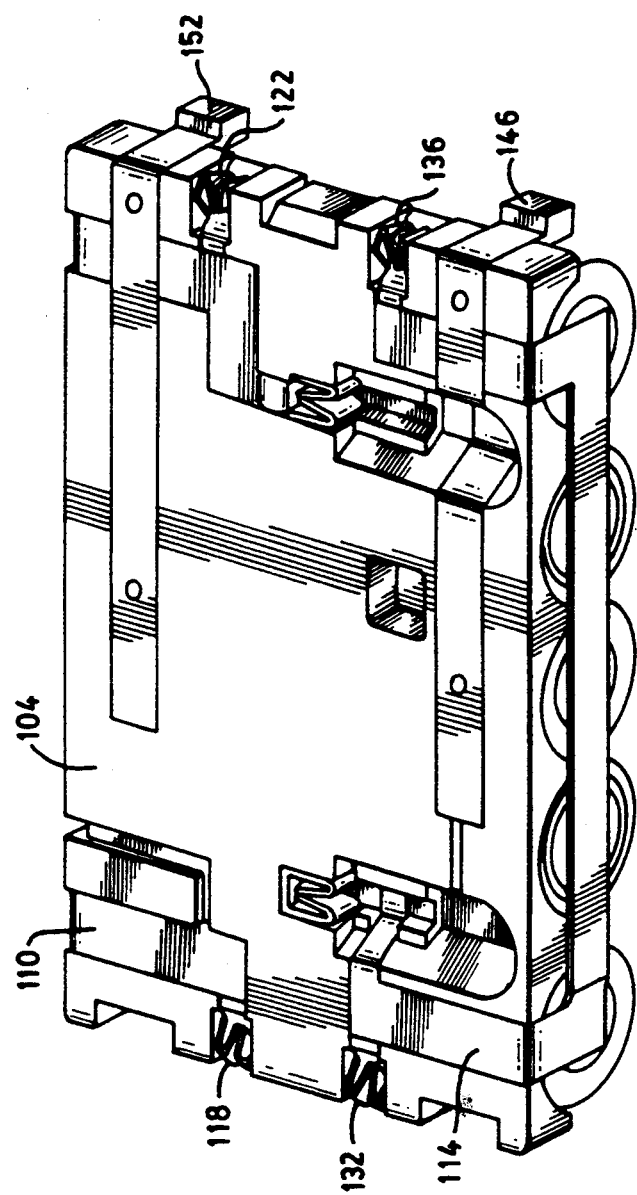
FIG. 4 illustrates a bottom view of various components of FIG. 1 as preferably assembled prior to being inserted in the case.

Turning now to FIG. 4, a bottom view of various components of FIG. 1 as preferably assembled prior to being enclosed by the case is illustrated. The bottom of cell tray 104 is shown, along with negative bus 110, positive bus 114, temperature bus 146 and data bus 152 assembled thereto.

Case bottom 126 and case top 150 are preferably manufactured from plastic. As will be appreciated by those skilled in the art, the case bottom and top are preferably securely joined together by ultrasonic welding, although any other suitable method known in the an may be employed.

Figure 5:
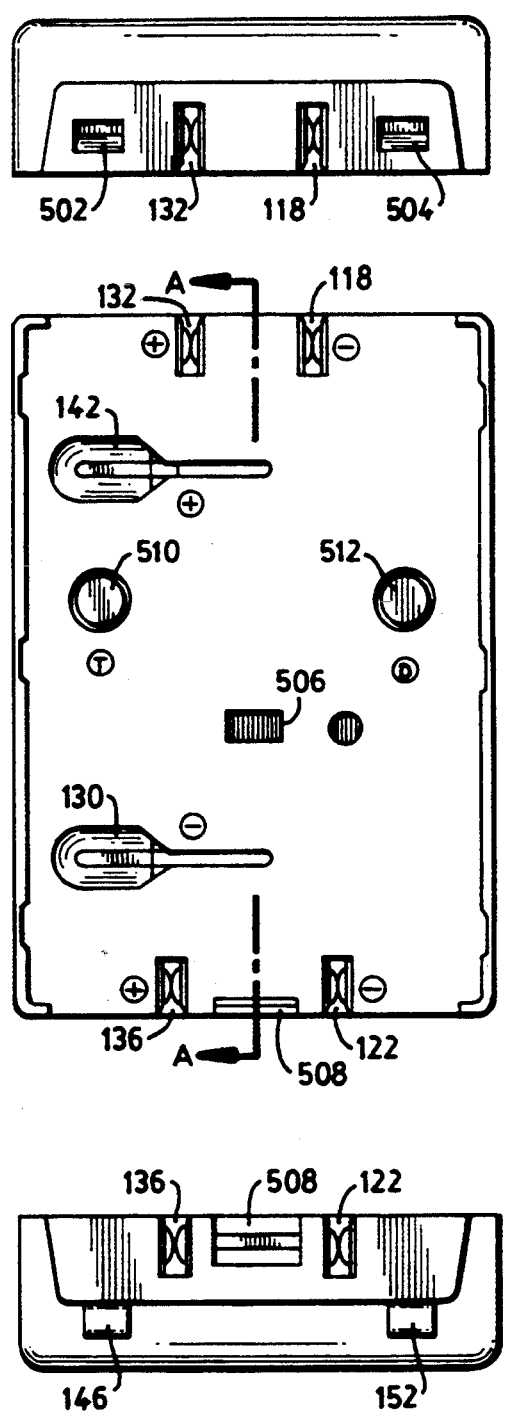
FIG. 5 illustrates a bottom view of the energy pack of FIG. 1, as well as a side view of two of the side surfaces thereof.

Turning now to FIG. 5, a bottom view of the universal energy pack of FIG. 1, as well as a side view of two of the side surfaces thereof, is illustrated. With reference to FIG. 5, energy pack 100 preferably includes recesses 502 and 504, as well as recesses 506 and 508. Recesses 502 and 504, in conjunction with either recess 506 or 508, are intended to mate with corresponding locking mechanisms to allow the universal energy pack to be securely attached to an electronic device.

Figure 6:
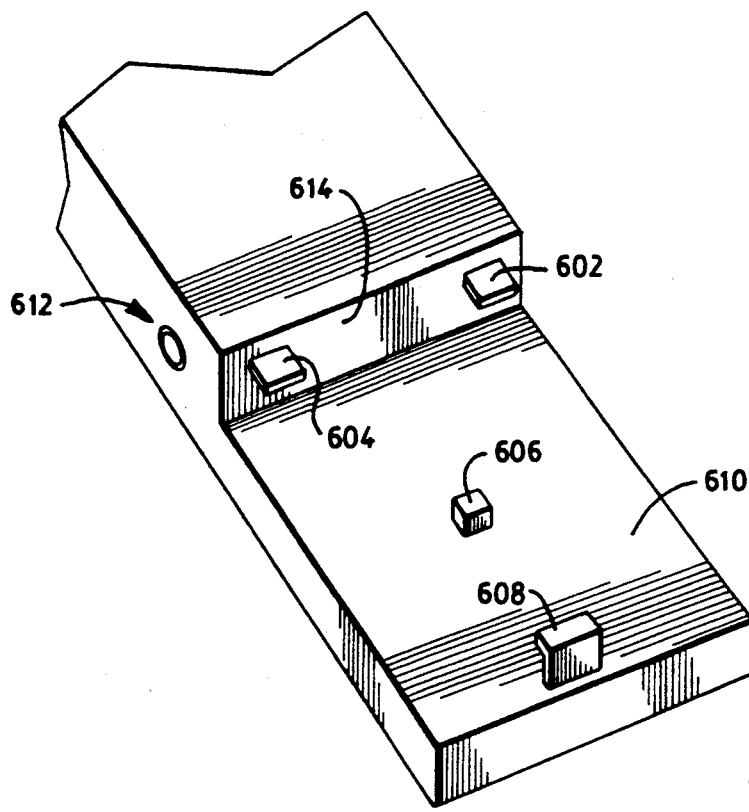
FIG. 6 depicts a device, having a first type of mounting arrangement, onto which the energy pack of FIG. 1 can be mounted.

For example, with reference to FIG. 6, an electronic device is shown designed with tabs 602 and 604 intended to mate with recesses 502 and 504, respectively, of universal energy pack 100. Additionally, the device of FIG. 6 can be designed either with retracting post 606 or retracting post 608.

Post 606 is preferably designed to mate with recess 506, and is preferably retractable, via spring tension, to surface 610 when energy pack 100 is being located into position thereon. Once the energy pack is in position, post 606 extends into recess 506, thereby securing the energy pack thereto.

Similarly, post 608 is preferably designed to mate with recess 508, and is preferably retractable, via spring tension, to surface 610 when energy pack 100 is being located into position thereon. Once the energy pack is in position, post 608 extends into recess 508, thereby securing the energy pack thereto.

To remove the energy pack, the device of FIG. 6 is preferably designed with a mechanism, e.g., button 612, which when depressed retracts post 606 (or 608) to surface 610, thereby allowing the energy pack to be removed therefrom. Other recesses, either in addition to or instead of, recesses 502–508 may be provided to accommodate other release mechanism configurations.

It is noted that positive contacts 132 and 136, as well as negative contacts 118 and 122, are accessible from two sides, i.e., the bottom of the case as well as a side of the case. Thus, the device of FIG. 6 can be designed with corresponding mating electrodes (not shown) either on surface 610, on surface 614 or at the intersection therebetween.

Returning to FIG. 5, energy pack 100 preferably also includes openings 130 and 142 which correspond to contacts 120 and 134, respectively. Openings 130 and 142 are intended to mate with a corresponding locking mechanism to allow the universal energy pack to be securely attached to an electronic device. For example, with reference to FIG. 7, an electronic device is shown designed with locking contacts 702 and 704 intended to mate with openings 130 and 142, respectively, of universal energy pack 100.

Figure 7:
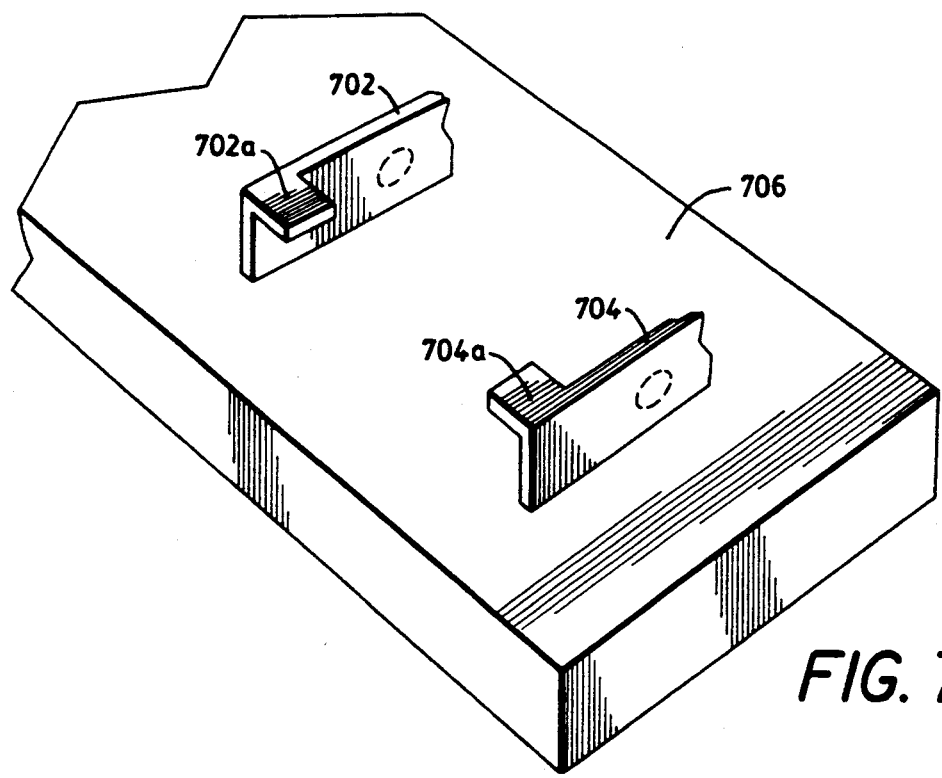
FIG. 7 depicts a device, having a second type of mounting arrangement, onto which the energy pack of FIG. 1 can be mounted.

The bottom surface of the energy pack attaches to the device of FIG. 7 via positioning openings 130 and 142 over the corresponding locking contacts 702 and 704, respectively, and slidably engaging locking contacts 702 and 704 into locking engagement with corresponding contacts 120 and 134, respectively.

Tabs 702a and 704a (FIG. 7) of locking contacts 702 and 704, respectively, are preferably designed to fit within covers 130a and 142a (FIG. 1, located adjacent openings 130 and 142). After the locking contacts have been slidably engaged into locking engagement with their corresponding contacts, tabs 702a and 704a are preferably located above openings 130 and 142, respectively (best shown in FIG. 1). Tabs 702a and 704a preferably extend beyond the raised surface of the openings, thereby precluding removal of the energy pack without first slidably disengaging the energy pack therefrom.

Figure 8A:
FIGS. 8(a), 8(b) and 8(c) illustrate the energy pack shown in FIG. 1 secured to two different cellular phones and to a camcorder, respectively.
Figure 8B:
Figure 8C:
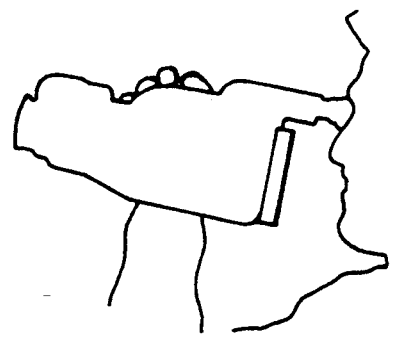

The universal energy pack of the present invention, due to the multiple contacts and contact locations, as well as the multiple recesses and openings intended to mate with corresponding locking mechanisms, is locatable on several types of devices. For example, a hand-held cellular telephone (FIGS. 8a and 8b) and a video camcorder (FIG. 8c).

Returning to FIG. 5, energy pack 100 preferably also includes openings 510 and 512. Opening 510 allows contact with the temperature bus, while opening 512 allows contact with the data bus. In this way, recharging can be accomplished either via a set-up shown in FIG. 6 or in FIG. 7.

All rechargeable energy packs eventually lose their capacity for holding a charge, especially after prolonged service life where the energy pack has been repeatedly recharged. Thus, the user ultimately disposes of the energy pack. Given the increasing desire of society to recycle, it would be advantageous to recycle energy packs. Accordingly, the energy pack of the present invention is designed to facilitate recycling.

Figure 9:
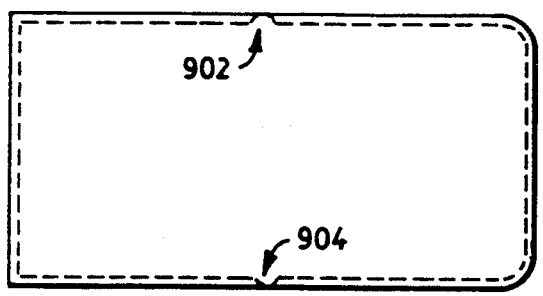
FIG. 9 illustrates a cross-sectional top view of the energy pack shown in FIG. 1 depicting an optional cross-sectional thickness of a first and second side surface thereof.
Figure 10:
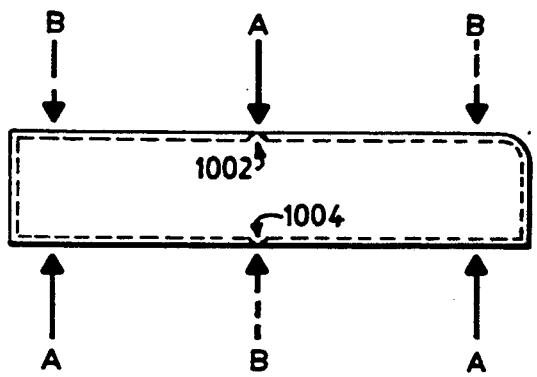
FIG. 10 illustrates a cross-sectional side view of the energy pack shown in FIG. 1 depicting an optional cross-sectional thickness of the top and bottom surfaces of the case.

FIG. 9 is a partial top view of the energy pack of FIG. 1, depicting the cross-sectional thickness of the side of the case. FIG. 10 is a partial side view of the energy pack of FIG. 1, depicting an optional cross-sectional thickness of the top and bottom surfaces of the case. With reference to FIGS. 9 and 10, channels 902 and 904 are preferably centered along two opposing side surfaces. Optionally, channels 1002 and 1004 can also be centered along the top and bottom surfaces, respectively, of the case to form a contiguous groove along the interior surface of the case.

Figure 11:
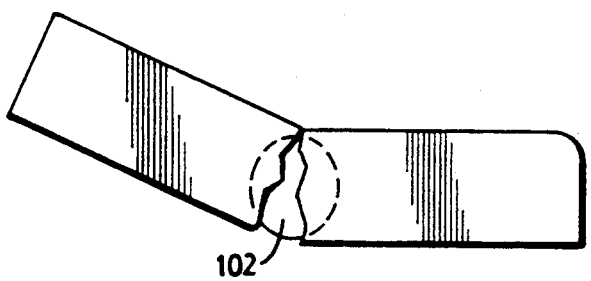
FIG. 11 depicts the configuration of the energy pack of FIG. 10 after pressure has been applied thereto at pressure points A.

Applying a sufficient amount of pressure at points A, the case should fracture along the channels, as depicted in FIG. 11. Once the housing is fractured, the cells located within the case, e.g., cell 102, should be readily accessible. Given the symmetrical nature of the channels, pressure may alternatively be applied at points B for similar results.

The depth of the channels can have any range relative to the case thickness. Given a case thickness of $\alpha$, the channel depth is preferably less than about 50% of $\alpha$, and more preferably about 15% of $\alpha$. In a preferred embodiment, the case thickness (exclusive of areas which may be thicker to provide for recesses, contact areas and the like) is about 1 mm. Other case thicknesses, channel depths, and their interrelationship, will be obvious to those skilled in the art, depending upon intended application, desired rigidity and fracturability, and the like.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. An energy pack capable of being attached to different electrical devices, said energy pack comprising:
   a case having an internal cavity;
   an electrochemical energy source having a positive and a negative output located within said case, and
   a first and a second female electrical contact, each being accessible from both a first exterior surface of said case and a second exterior surface of said case, wherein said first and second exterior surfaces are adjacent each other and wherein each of said first and second contacts is electrically connected to a respective said positive or negative output of said energy source.

2. The energy pack of claim 1, wherein said first and second contacts are each recessed in a respective opening in said case, with each said opening being in communication with both said first and second exterior surfaces.

3. The energy pack of claim 2, wherein each of said contacts comprises a pair of opposing contact surfaces.

4. The energy pack of claim 3 having a third and a fourth female electrical contact, each of which is recessed in a respective opening in said case and accessible from two different, adjacent exterior surfaces of said case, at least one of which said surfaces is not said first or said second surface, said third and fourth contacts being electrically connected to a respective positive and negative output of said energy source.

5. The energy pack of claim 4, wherein said third and fourth contacts each comprises a pair of resilient, opposing contact surfaces.

6. The energy pack of claim 1 wherein each of said contacts is adapted to releasably secure a respective male contact inserted into mating engagement therein through either of said first and second exterior surfaces.

7. The energy pack of claim 6, wherein said female contact surfaces are curved.

8. An energy pack of claim 7 wherein each said female contact is substantially perpendicular to at least one of its respective access surfaces.

9. An energy pack of claim 8 wherein each said female contact surface is curved convexly with respect to its said opposite and opposing contact surface.

10. An energy pack of claim 9 wherein each of said openings is continuous between its said respective exterior surfaces.

11. An energy pack of claim 10 wherein each said female contact includes a pair of opposite and opposing, resilient, U-shaped contact arms.

12. An energy pack containing an electrochemical source of electricity having positive and negative terminals for supplying electricity to an electrical device, said pack comprising a top, a bottom, a plurality of side walls adjacent said top and bottom, a plurality of openings in at least one of said side walls, with each of said openings containing recessed within a female electrical contact electrically connected to one of said terminals, and with openings in said top or bottom permitting each said contact to be accessible from one of said adjacent top and bottom surfaces and from said exterior wall surface.

13. A pack according to claim 12 wherein said contacts each comprise a pair of resilient and opposing contact surfaces for releasably securing a male contact inserted in mating engagement therein through said opening.

14. A pack according to claim 13 wherein each said female contact surface is convexly curved with respect to its said opposite and opposing contact surface.

15. A pack according to claim 14 wherein each said female contact comprises a pair of parallel arms.

16. A pack according to claim 15 wherein each of said arms is U-shaped.

17. A battery pack containing an electrochemical source of electricity having positive and negative terminals for supplying electricity to different electrical devices, said pack comprising a top, a bottom, a plurality of side walls adjacent said top and bottom, at least two openings in at least one of said side walls with each said opening being in communication with the exterior surface of said wall and the exterior surface of an adjacent said top or bottom, each of which said openings contains recessed within a resilient female electrical contact connected to one of said terminals and adapted for releasably securing a pin, blade or disk type of male contact inserted in mating engagement therein from said exterior wall surface and of said adjacent top and bottom surfaces, with said female contacts further having contact surfaces perpendicular to its respective adjacent surfaces.

18. A battery pack of claim 17 wherein each of said openings is continuous from its respective said wall and top or bottom, so that a respective male contact can be inserted into said female contact recessed within from said side, said top or bottom or any angle therebetween.

19. A battery pack of claim 18 wherein at least one of said contact surfaces of each said female contacts is curved.

20. A battery pack of claim 19 wherein said contact surfaces are convexly curved.

21. A battery pack of claim 20 wherein said female contacts comprise a pair of U-shaped contact arms.

* * * * *